United States Patent
Lee (12)

(10) Patent No.: US 11,958,452 B2
(45) Date of Patent: Apr. 16, 2024

(54) INTEGRATED BRAKING DEVICE FOR VEHICLE AND BRAKING METHOD THEREFOR

(71) Applicant: HYUNDAI MOBIS CO., LTD., Seoul (KR)

(72) Inventor: Dong Uk Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 559 days.

(21) Appl. No.: 17/130,909

(22) Filed: Dec. 22, 2020

(65) Prior Publication Data

US 2022/0135012 A1 May 5, 2022

(30) Foreign Application Priority Data

Oct. 30, 2020 (KR) .......................... 10-2020-0142896

(51) Int. Cl.
*B60T 8/40* (2006.01)
*B60T 7/04* (2006.01)
(Continued)

(52) U.S. Cl.
CPC ............ *B60T 13/686* (2013.01); *B60T 7/042* (2013.01); *B60T 7/12* (2013.01); *B60T 8/176* (2013.01);
(Continued)

(58) Field of Classification Search
CPC ...... B60T 13/686; B60T 8/4063; B60T 7/042; B60T 7/12; B60T 8/176; B60T 8/326;
(Continued)

(56) References Cited

U.S. PATENT DOCUMENTS 5,529,388 A 6/1996 Yasui
6,113,197 A * 9/2000 Kuroki .................... B60T 7/042
303/11
(Continued)

FOREIGN PATENT DOCUMENTS

CN 102963342 A 3/2013
CN 105473396 A 4/2016
(Continued)

OTHER PUBLICATIONS

Chinese Office Action dated May 18, 2023, issued in corresponding Chinese Patent Application No. 2020115846367.
(Continued)

*Primary Examiner* — Bradley T King
(74) *Attorney, Agent, or Firm* — Morgan, Lewis & Bockius LLP

(57) ABSTRACT

An integrated braking device for a vehicle equipped with wheel brakes includes a reservoir, master cylinder, bi-directional pumps each using hydraulic pressure oil from the reservoir for generating hydraulic pressure in first direction to apply braking force to the wheel brakes or generating hydraulic pressure in opposing second direction to control the hydraulic pressure oil from flowing to the reservoir, a hydraulic motor for driving the bi-directional pumps, inlet valves for controlling a hydraulic pressure from flowing from the bi-directional pumps to the wheel brakes, traction control valves each disposed between the master cylinder and each bi-directional pump to control flow of the hydraulic pressure oil inside the master cylinder, and a braking control unit for braking the vehicle by transmitting a driving signal to solenoid valves in the integrated braking device, the bi-directional pumps, and the hydraulic motor to control a flow of the hydraulic pressure.

12 Claims, 6 Drawing Sheets

(51) Int. Cl.
*B60T 7/12* (2006.01)
*B60T 8/176* (2006.01)
*B60T 8/32* (2006.01)
*B60T 13/14* (2006.01)
*B60T 13/68* (2006.01)
*B60T 15/02* (2006.01)

(52) U.S. Cl.
CPC ............ *B60T 8/326* (2013.01); *B60T 13/145* (2013.01); *B60T 15/028* (2013.01); *B60T 2220/04* (2013.01); *B60T 2250/00* (2013.01); *B60T 2270/10* (2013.01); *B60T 2270/82* (2013.01)

(58) Field of Classification Search
CPC .. B60T 13/145; B60T 15/028; B60T 2220/04; B60T 2250/00; B60T 2270/10; B60T 2270/82
See application file for complete search history.

(56) References Cited

U.S. PATENT DOCUMENTS

| | | | | |
|---|---|---|---|---|
| 6,123,396 | A * | 9/2000 | Siegel | B60T 8/5025 303/900 |
| 6,481,805 | B1 * | 11/2002 | Ichinose | B60T 7/042 188/72.3 |
| 9,821,784 | B2 * | 11/2017 | Oosawa | B60T 8/348 |
| 2008/0234909 | A1 * | 9/2008 | Iwasaki | B62D 5/065 701/70 |
| 2010/0295363 | A1 * | 11/2010 | Miyazaki | B60T 8/442 188/106 P |
| 2013/0049449 | A1 | 2/2013 | Watanabe | |
| 2015/0035353 | A1 * | 2/2015 | Drumm | B60T 8/3655 303/15 |
| 2016/0200307 | A1 | 7/2016 | Feigel | |
| 2016/0214591 | A1 | 7/2016 | Yang | |
| 2020/0017092 | A1 | 1/2020 | Ahn et al. | |
| 2020/0114894 | A1 | 4/2020 | Leiber | |

FOREIGN PATENT DOCUMENTS

| | | |
|---|---|---|
| CN | 110712634 A | 1/2020 |
| DE | 103 19 3338 A1 | 11/2004 |
| DE | 10 2017 114 556 A2 | 1/2019 |
| JP | H06-191386 A | 7/1994 |
| JP | H06-211120 A | 8/1994 |
| JP | 2001-315629 A | 11/2001 |
| KR | 10-2018-0067357 A | 6/2018 |
| KR | 10-2020-006868 A | 1/2020 |

OTHER PUBLICATIONS

Office Action dated Nov. 1, 2023 in Chinese Patent Application No. 2020115846367.

* cited by examiner

INTEGRATED BRAKING DEVICE FOR VEHICLE AND BRAKING METHOD THEREFOR

CROSS-REFERENCE TO RELATED APPLICATION

This application is based on, and claims priority from, Korean Patent Application Number 10-2020-0142896, filed Oct. 30, 2020, the disclosure of which is incorporated by reference herein in its entirety.

TECHNICAL FIELD

The present disclosure in some embodiments relates to a braking system for a vehicle and a braking method therefor.

BACKGROUND

The statements in this section merely provide background information related to the present disclosure and do not necessarily constitute prior art.

Internationally, regulations are being stringent on the emission of carbon dioxide, especially among vehicle exhaust gases. Accordingly, to reduce the amount of carbon dioxide, the improved fuel efficiency of vehicles is also increasingly demanded. In concert with these popular demands, recent years have seen the increasing supply and demand for hybrid vehicles having an internal combustion engine and an electric motor combined and electric vehicles driven by an electric motor.

The need for regenerative braking is on the rise due to the increase in electric vehicles and hybrid vehicles, and to satisfy this need, there is an increasing demand for integrated braking systems for vehicles, in which the brake pedal is separated from the brake hydraulic lines or flow paths to the wheels. The integrated braking system is an integration of a mechanical brake system called a conventional brake system (CBS) and an electronic brake system called electronic stability control (ESC) system. Here, regenerative braking refers to driving a motor as a generator with the driving inertia of a vehicle and using a resistance generated by driving the motor as a braking force. Such an integrated vehicle braking system can supply a stable braking force through coordinated control of regenerative braking and hydraulic braking.

However, such an integrated vehicle braking system is disadvantageously expensive and undesirably large in volume and weight. Particularly, in the configurations of an integrated vehicle braking system, a conventional hydraulic pump has utilized a ball screw and a cylinder in the pumping operation, resulting in a disadvantageously bulky and heavy apparatus and undesirably high production cost.

Additionally, integrated vehicle braking systems hitherto developed suffer from a durability issue due to their high frequency of use of specific valves (Cf. FIG. 1 showing first and second traction control valves) when boosting/dropping braking pressure, impairing efforts to mitigate unwanted noise, vibration, and harshness (NVH).

SUMMARY

According to at least one embodiment, the present disclosure provides an integrated braking device for a vehicle equipped with wheel brakes for braking the vehicle, which includes a reservoir, a master cylinder, bi-directional pumps, a hydraulic motor, inlet valves, traction control valves, and a braking control unit. The bi-directional pumps are each arranged to use hydraulic pressure oil supplied from the reservoir for generating hydraulic pressure in a first direction to apply a braking force to the wheel brakes or generating hydraulic pressure in a second direction opposing the first direction to control the hydraulic pressure oil from flowing to the reservoir. The hydraulic motor is arranged to drive the bi-directional pumps. The inlet valves are arranged to control hydraulic pressure from flowing from the bi-directional pumps to the wheel brakes. The traction control valves are each disposed between the master cylinder and each of the bi-directional pumps to control a flow of the hydraulic pressure oil inside the master cylinder. The braking control unit is configured to perform the braking of the vehicle by transmitting a driving signal to solenoid valves included in the integrated braking device, the bi-directional pumps, and the hydraulic motor and thereby control a flow of the hydraulic pressure.

According to another embodiment, the present disclosure provides a method of controlling an integrated braking device for a vehicle equipped with wheel brakes for braking the vehicle and including bi-directional pumps capable of discharging hydraulic pressure oil bidirectionally, which includes determining whether the vehicle has been started, and closing traction control valves each disposed between a master cylinder and each of the bi-directional pumps upon determining that the vehicle has been started, and determining whether the vehicle needs to be braked due to a depression of a brake pedal by a driver of the vehicle or a detection of braking while the vehicle is running, and upon determining that the vehicle needs to be braked, driving the bi-directional pumps in a first direction to supply a braking force to the wheel brakes, and upon determining that the vehicle needs to be braked no longer, reducing the braking force supplied to the wheel brakes by driving the bi-directional pumps in a second direction.

Figure 1:
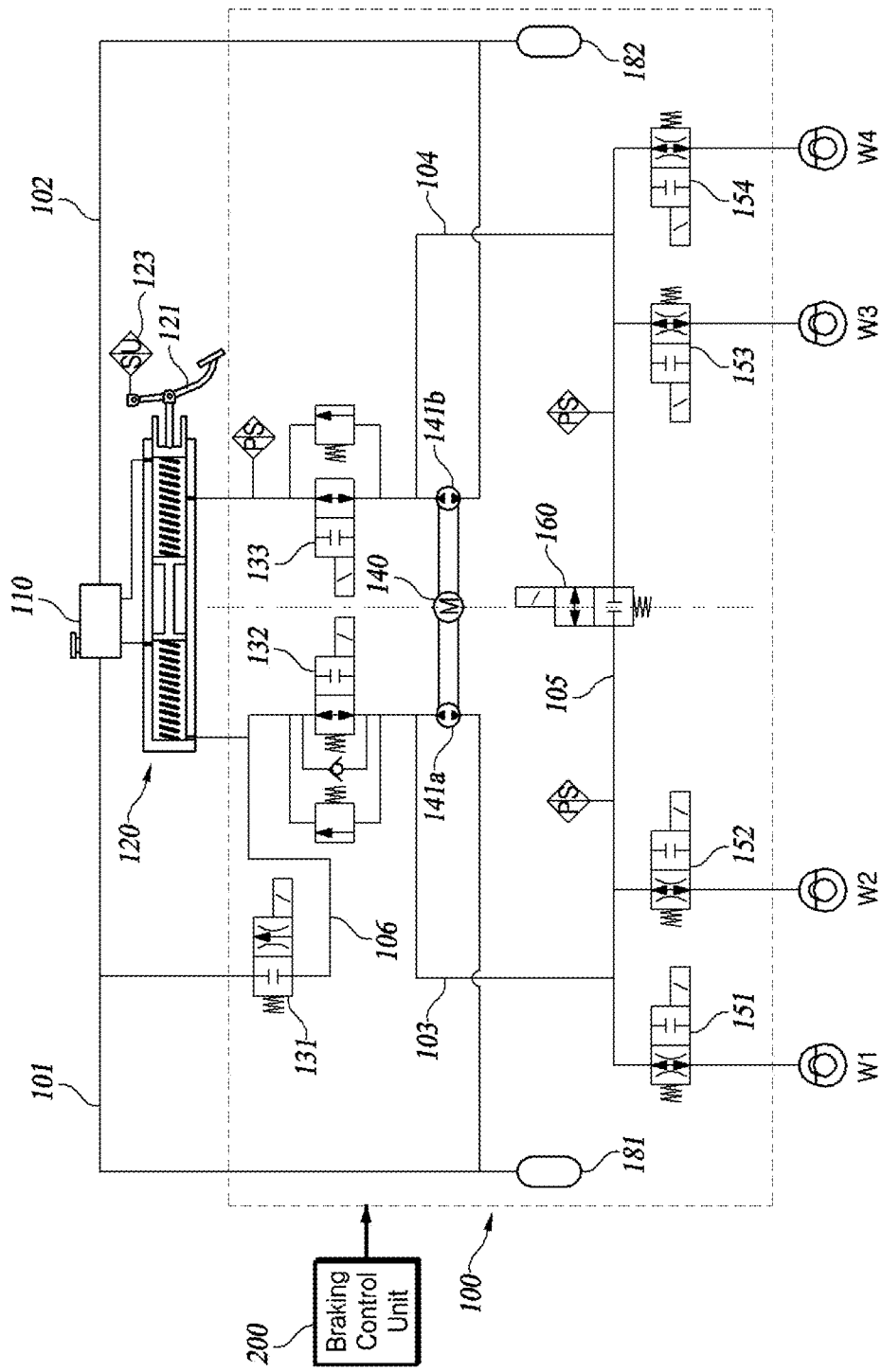
FIG. 1 is a block diagram of an integrated braking device for a vehicle, according to at least one embodiment of the present disclosure.

| REFERENCE NUMERALS | |
|---|---|
| 100: braking device | 101: first supply flow path |
| 102: second supply flow path | 103: first brake fluid path |
| 104: second brake fluid path | 105: mixing fluid path |
| 110: reservoir | 120: master cylinder |
| 121: brake pedal | 123: stroke sensor |
| 131: return valve | 132: first traction control valve |
| 133: second traction control valve | 140: hydraulic motor |
| 141a: first bi-directional pump | 141b: second bi-directional pump |
| 151: first inlet valve | 152: second inlet valve |
| 153: third inlet valve | 154: fourth inlet valve |
| 160: mixing valve | 181: first oil chamber |
| 182: second oil chamber | 200: braking control unit |
| w1, w2, w3, w4: first to fourth wheel brake | |

DETAILED DESCRIPTION

At least one embodiment of the present disclosure seeks to minimize the number of solenoid valves that compose an integrated braking device for a vehicle to save the manufacturing cost and reduce the volume and weight of the integrated braking device.

Further, the present disclosure replaces the hydraulic pumps in the configuration of an integrated vehicle braking device with a bi-directional pump over a one-directional pump and thereby enables a rapid pressure boosting/dropping not only in the hydraulic pressure boosting process but even in the pressure dropping process to perform precise control of vehicle braking when needed.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto.

In this specification, the terms 'left' and 'right' are merely used to indicate directions in which certain components are illustrated in the drawings, and the present disclosure is not limited to the illustrated orientation and position of the components.

Figure 2:
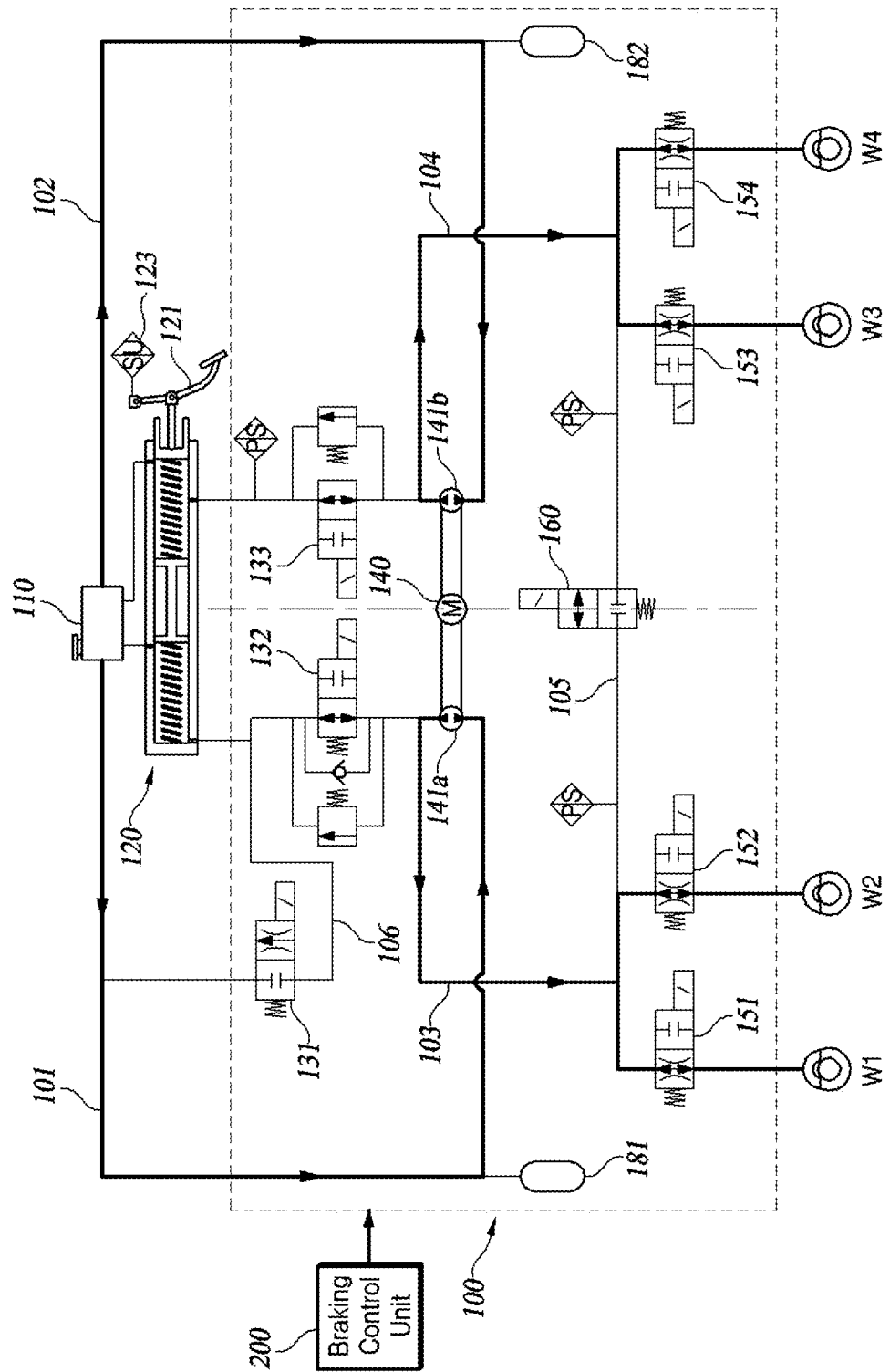
FIG. 2 is a block diagram of the vehicular integrated braking device illustrating a flow of hydraulic pressure oil when supplying a braking force to wheel brakes by using bi-directional pumps, according to at least one embodiment.
Figure 3:
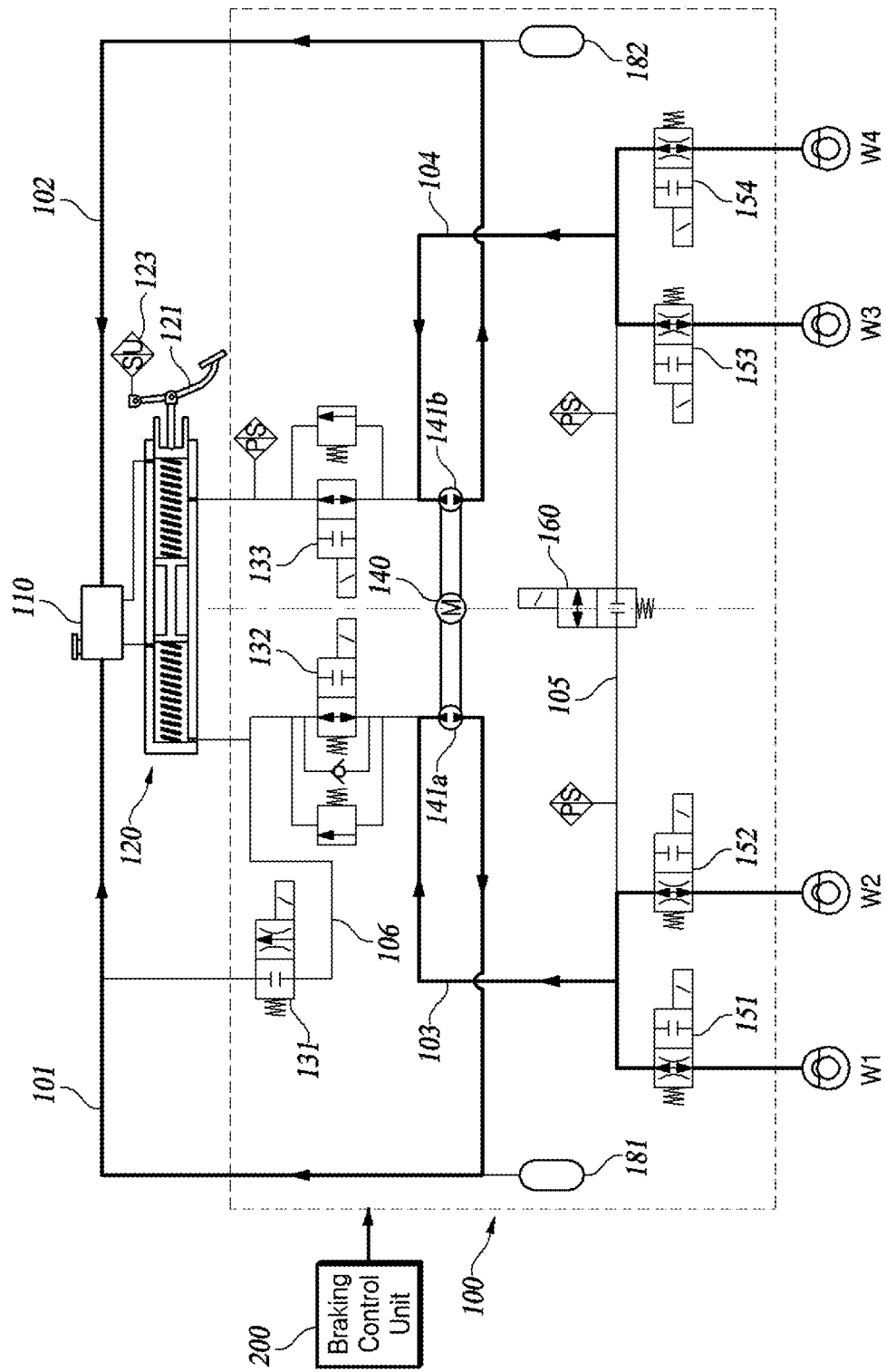
FIG. 3 is a block diagram of the vehicular integrated braking device illustrating a flow of hydraulic pressure oil when reducing a braking force supplied to the wheel brakes by using the bi-directional pumps, according to at least one embodiment.
Figure 4:
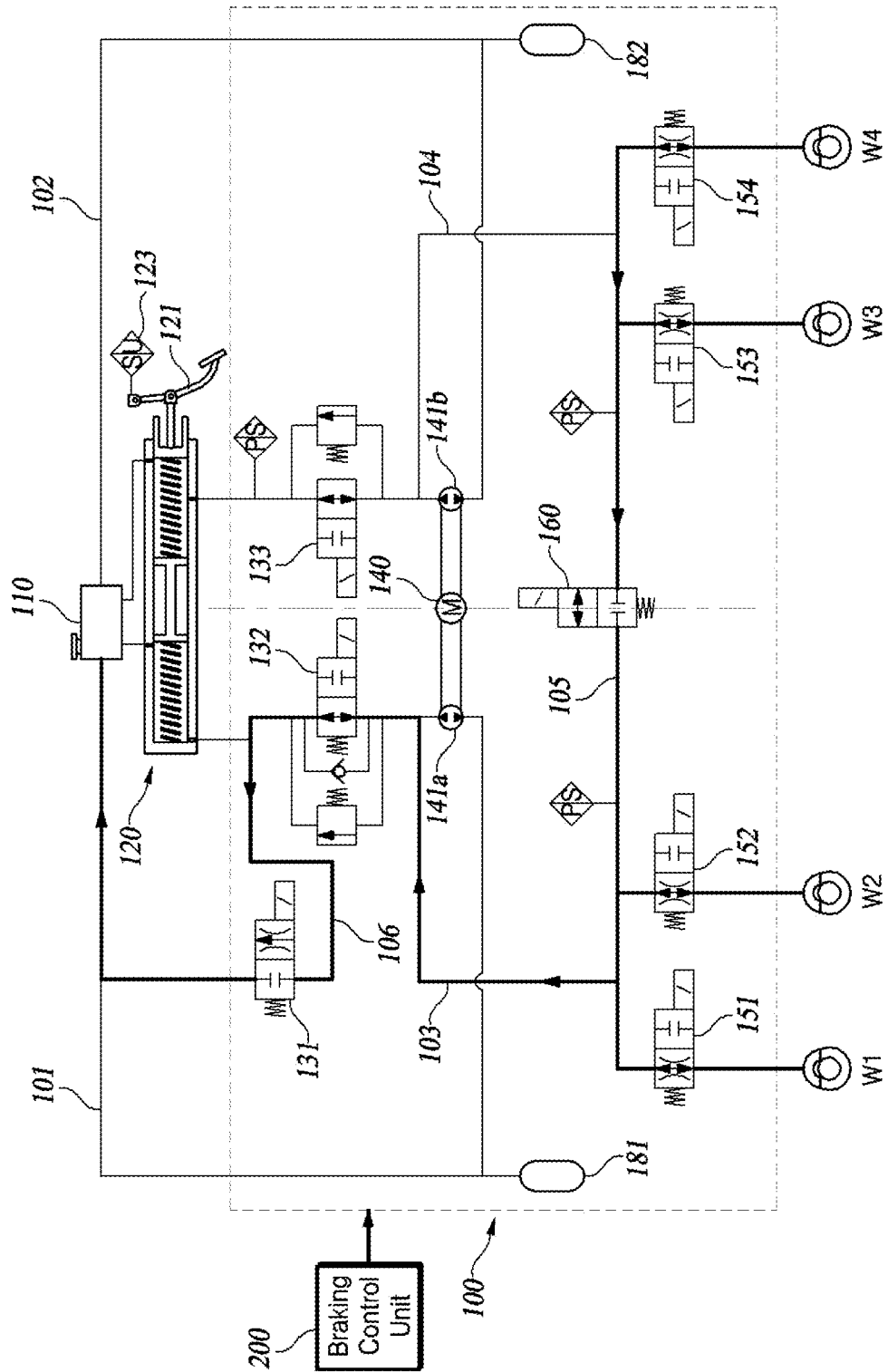
FIG. 4 is a block diagram of the vehicular integrated braking device illustrating a flow of hydraulic pressure oil when reducing a braking force supplied to the wheel brakes by using a first traction control valve, according to at least one embodiment.

FIG. 1 is a block diagram of an integrated braking device for a vehicle, according to at least one embodiment of the present disclosure. FIG. 2 a block diagram of the vehicular integrated braking device illustrating a flow of hydraulic pressure oil when supplying a braking force to wheel brakes by using bi-directional pumps. FIG. 3 is a block diagram of the vehicular integrated braking device illustrating a flow of hydraulic pressure oil when reducing a braking force supplied to the wheel brakes by using the bi-directional pumps. FIG. 4 is a block diagram of the vehicular integrated braking device illustrating a flow of hydraulic pressure oil when reducing a braking force supplied to the wheel brakes by using a first traction control valve.

As shown in FIG. 1, the vehicular integrated braking device includes all or some of a reservoir 110, a master cylinder 120, first and second traction control valves 132, 133, a return valve 131, first to fourth inlet valves 151, 152, 153, 154, a hydraulic motor 140, first and second bi-directional pumps 141a, 141b, a mixing valve 160, first and second oil chambers 181, 182, and a braking control unit 200.

The reservoir 110 is an oil tank for storing hydraulic pressure oil. The reservoir 110 stores hydraulic pressure oil to be supplied to the master cylinder 120 and the first and second bi-directional pumps 141a, 141b.

The first and second traction control valves 132, 133 are solenoid valves disposed between the master cylinder 120 and the first and second bi-directional pumps 141a, 141b to control the flow of hydraulic pressure. The first and second traction control valves 132, 133 may be formed of a type that is open normally when a control signal is not inputted from the braking control unit 200. When the vehicle is started or turned on, the braking control unit 200 transmits a control signal to the first and second traction control valves 132, 133 to close thereof and thereby blocks the hydraulic flow between the master cylinder 120 and the first and second bi-directional pumps 141a, 141b. By closing the first and second traction control valves 132, 133, when depressing a brake pedal 121, the driver can get a pedal feel due to the hydraulic pressure inside the master cylinder 120. The first traction control valve 132 and the second traction control valve 133 act independently of each other, and the opening and closing of one of the traction control valves do not affect the opening and closing of the other.

The driver's pedal depression with the brake pedal 121 is detected by a stroke sensor 122 provided in the brake pedal 121, which transmits a stepping signal or depression signal to the braking control unit 200. The braking control unit 200 then calculates the required hydraulic pressure for braking based on the depression signal to control the responsible components including the hydraulic motor 140, the first and second bi-directional pumps 141a, 141b, and various valves for supplying the hydraulic pressure required for braking the vehicle to a first to fourth wheel brake w1, w2, w3, w4 installed therein.

The return valve 131 is adapted to be opened when the vehicle is started. The return valve 131 returns some of the pressure in the master cylinder 120, which is generated when the driver depresses the brake pedal 121 to the reservoir 110 to prevent unnecessary pressure buildup. In other words, the return valve 131 may prevent unnecessary pressure generation in the master cylinder 120 to provide the driver with an appropriate pedal feel when depressing the brake pedal 121. Additionally, when recovered to the reservoir 110, the hydraulic pressure oil may go through the opened return valve 131. The return valve 131 may be configured to be closed normally when no control signal is inputted from the braking control unit 200.

The first and second bi-directional pumps 141a, 141b are disposed on the left and right sides of the hydraulic motor 140, respectively. The first and second bi-directional pumps 141a, 141b may be composed of rotary pumps. The first and second bi-directional pumps 141a, 141b are connected to the rotor shaft of the hydraulic motor 140 and are operated by the rotation of the hydraulic motor 140 to control the flow of hydraulic pressure. The first and second bi-directional pumps 141a, 141b may apply hydraulic pressure in a first direction and a second direction opposite to the first direction. Here, in the first direction, the hydraulic pressure oil flows from the first and second bi-directional pumps 141a, 141b through the first to fourth inlet valves 152, 152, 153, 154 to the first to fourth wheel brakes w1, w2, w3, w4. In the second direction, the hydraulic pressure oil flows from the first and second bi-directional pumps 141a, 141b to the reservoir 110 along first and second supply flow paths 101, 102. Here, the first to fourth inlet valves 151, 152, 153, 154 may be configured to be opened normally when no control signal is inputted from the braking control unit 200.

The first and second oil chambers 181, 182 are disposed on the first and second supply flow paths 101, 102, respectively, to improve the pressure increasing performance of the same supply flow paths 101, 102 which are arranged to channel the hydraulic pressure oil from the reservoir 110 to the first and second bi-directional pumps 141a, 141b. The first and second oil chambers 181 and 182 store hydraulic pressure oil which may be supplied right from the reservoir 110 or through the first and second bi-directional pumps 141a, 141b when driven in the second direction.

The first and second oil chambers 181, 182 are configured as additional devices for increasing the pressure boosting efficiency in a braking situation by preventing the decline of pumping efficiency in the suction operation of the first and second bi-directional pumps 141a, 141b due to their remoteness from the reservoir 110. Accordingly, the first and second oil chambers 181, 182 may be omitted from the configuration of at least one embodiment of the present disclosure.

The first to fourth inlet valves 151, 152, 153, 154 are disposed on first and second brake fluid paths 103, 104 extending from the first and second bi-directional pumps 141a, 141b to the first to fourth wheel brakes w1, w2, w3, w4 along the route of hydraulic pressure flowing therethrough to control the same. The first and second inlet valves 151, 152 control the flow of hydraulic pressure oil that is supplied from the first bi-directional pump 141a, while the third and fourth inlet valves 153, 154 control the flow of hydraulic pressure oil that is supplied from the second bi-directional pump 141b.

The inlet valves according to at least one embodiment of the present disclosure do not have a separate check valve, unlike inlet valves according to a conventional integrated vehicle braking system. The inlet valves according to the conventional integrated vehicle braking system generally serve to supply or maintain the braking force supplied to wheel brakes, whereas the inlet valves according to at least one embodiment of the present disclosure further serve to decrease the braking force supplied to the wheel brakes, which is the same as the conventional outlet valves dropping the braking pressure. Therefore, the conventional integrated vehicle braking systems require four additional outlet valves to be arranged, but the integrated braking device for a vehicle according to at least one embodiment of the present disclosure excludes the outlet valves to perform the full process of increasing, maintaining and decreasing the braking pressure by using the first to fourth inlet valves 151, 152, 153, 154 alone. By reducing the number of solenoid valves installed in the vehicular integrated braking device, the production cost, as well as the size and weight of the system can be reduced. Here, the first to fourth inlet valves 151, 152, 153, 154 may be configured to be opened normally when no control signal is inputted from the braking control unit 200.

Disposed between the first brake fluid path 103 and the second brake fluid path 104 is a mixing fluid path 105 on which a mixing valve 160 is installed. The mixing valve 160 is installed to control the flow of hydraulic pressure oil between the first brake fluid path 103 and the second brake fluid path 104.

The braking control unit 200 transmits a driving signal to various valves, the first and second bi-directional pumps 141a, 141b, and the hydraulic motor 140 included in the vehicular integrated braking device to control the hydraulic flow and thereby performs braking of the vehicle. The braking control unit 200 may be included as a part of an electronic control unit (ECU) installed in the vehicle, or it may be physically separated from the ECU to perform separate control of the vehicular integrated braking device. The braking control unit 200 may include a hardware processor and a memory that stores at least a command for executing the braking control unit 200 and a command required for vehicle braking.

When the vehicle is turned on, the braking control unit 200 transmits a control signal to the first and second traction control valves 132, 133 to close thereof and thereby stops the hydraulic flow between the cylinder 120 and the first and second bi-directional pumps 141a, 141b. According to at least one embodiment of the present disclosure, when the driver depresses the brake pedal 121, the vehicular integrated braking device is configured not to cause the pedal stroke to directly relay the hydraulic pressure to the first to fourth wheel brakes w1, w2, w3, w4 but to receive the pedal depression on the brake pedal 121 and utilize the hydraulic motor 140 for generating and delivering a braking force corresponding to the pedal depression as hydraulic pressure to the first to fourth wheel brakes w1, w2, w3, w4.

The closed first and second traction control valves 132, 133 effect blocking of the flow of hydraulic pressure oil inside the master cylinder 120 so that the driver can get the pedal feel when stepping on the brake pedal 121 due to the resistance of hydraulic pressure oil or other factors. The pedal feel generated by depressing the brake pedal 121 may be adjusted by the braking control unit 200 controlling the opening and closing of the return valve 131.

The braking control unit 200 when in a braking situation may properly adjust the opening and closing of the first to fourth inlet valves 151, 152, 153, 154 and driving directions of the first and second bi-directional pumps 141a, 141b to brake the vehicle without the occurrence of the wheel lock. Here, since the opening and closing of each inlet valve is independently controlled, the first to fourth inlet valves 151, 152, 153, 154 do not have to be opened or closed altogether.

FIG. 2 illustrates a path for hydraulic pressure oil to start from the reservoir 110 to supply braking force to the first to fourth wheel brakes w1, w2, w3, w4.

When the braking control unit 200 determines that braking force needs to be supplied to the wheel brakes, it opens the inlet valves of the relevant wheel brakes and drives the first and/or second bi-directional pumps 141a and/or 141b in the first direction to supply the braking force to the relevant wheel brakes. Among other occasions, when the driver depresses the brake pedal 121 or when the vehicle determines that deceleration or braking of the vehicle is necessary during autonomous driving without driver intervention, the braking control unit 200 determines that braking force needs to be supplied to the relevant wheel brakes.

Hydraulic pressure oil is supplied from the reservoir 110 and delivered along the first and second supply flow paths 101 and 102 to the first and second bi-directional pumps 141a, 141b. While the hydraulic pressure oil moves along the first and second supply flow paths 101 and 102, it may fill up the first and second oil chambers 181, 182. Additionally, when sufficiently filled with the hydraulic pressure oil, the first and second oil chambers 181, 182 may be responsive to when a braking situation occurs and increased pressure is required for providing the hydraulic pressure oil to the pumps 141a, 141b more quickly to improve the pressure boosting performance. The first and second bi-directional pumps 141a, 141b may be driven by the hydraulic motor 140 in the first direction, thereby delivering the hydraulic pressure oil along the first and second brake flow paths 103, 104 to the first to fourth inlet valves 151, 152, 153, 154. The hydraulic pressure oil passes only to the open inlet valves among the first to fourth inlet valves 151, 152, 153, 154, so that braking force is allowed to be supplied to the relevant wheel brakes.

FIG. 3 illustrates a path, which is the same as shown in FIG. 2, for delivering hydraulic pressure oil in a different direction for decreasing the braking force supplied to the first to fourth wheel brakes w1, w2, w3, w4.

When the braking control unit 200 determines that the braking force supplied to the wheel brakes needs to be reduced, it opens the inlet valves of the relevant wheel brakes and drives the first and/or the second bi-directional pump 141a and/or 141b in the second direction to withdraw the hydraulic pressure oil from the relevant wheel brakes after braking thereof. The braking control unit 200 determines that it needs to reduce the braking force of the relevant wheel brakes on occasions when the driver finishes depressing the brake pedal 121, when the vehicle determines that deceleration of the vehicle is no longer necessary during autonomous driving without driver intervention, or when a wheel lock phenomenon occurs in a wheel.

The braking control unit 200 drives the first and second bi-directional pumps 141a, 141b in the second direction while opening the inlet valves corresponding to the wheels requiring a reduction in braking force to transfer the hydraulic pressure oil from the relevant wheel brakes back toward the reservoir 110. Where the first and second oil chambers 181, 182 are disposed in the first and second supply flow paths 101 and 102 when the hydraulic pressure oil flows toward the reservoir 110, the hydraulic pressure oil fills the first and second oil chambers 181, 182, too. In the conventional integrated braking system for vehicles, separate outlet valves were additionally provided and used to induce the decrease of the braking force supplied to the wheel brakes, but according to the present disclosure, the integrated braking device for vehicles can perform the above-described depressurization with the inlet valves alone, requiring no outlet valves.

FIG. 4 shows not only the pressure-drop path of the hydraulic pressure oil shown in FIG. 3 but also another path for the hydraulic pressure oil supplied to the first to fourth wheel brakes w1, w2, w3, w4 to be recovered to the reservoir 110. The pressure-drop path shown in FIG. 4 is a path for decreasing the hydraulic braking force supplied to the first to fourth wheel brakes w1, w2, w3, w4 without driving the first and second bi-directional pumps 141a, 141b.

The braking control unit 200 can perform pressure dropping through the recovery flow path 106 by opening the first to fourth inlet valves 151, 152, 153, 154 and the mixing valve 160 and opening the first traction control valve 132 and the return valve 131.

The vehicular integrated braking device according to at least one embodiment of the present disclosure can quickly decrease the hydraulic braking force of the wheel brakes when needed through the two paths. This pressure dropping performance is more effective in preventing wheel lock from occurring in the vehicle.

FIGS. 2 to 4 show that the first to fourth inlet valves 151, 152, 153, 154 are all open, although they are not so limited, and just one or more of the inlet valves may be opened to provide braking force to some of the first to fourth wheel brakes w1, w2, w3, and w4. Further, the first and second bi-directional pumps 141a, 141b are not necessarily driven together, and when driven together, they are not necessarily driven in the same direction. Here, the same direction refers to the first direction or the second direction. For example, the first bi-directional pump 141a is driven in the first direction, and only the first inlet valve 151 of the first inlet valve 151 and the second inlet valve 152 is opened to supply braking force partially to the first wheel brake w1 alone.

Figure 5:
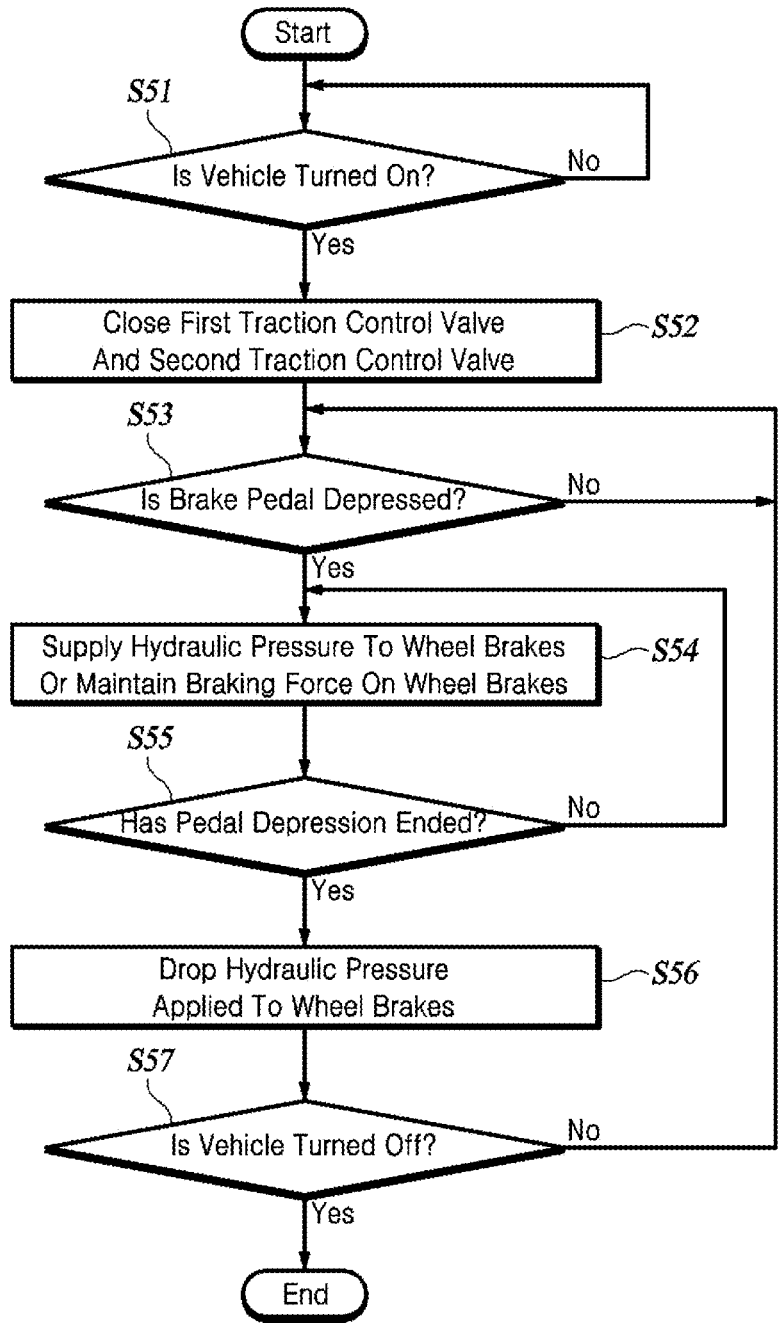
FIG. 5 is a flowchart of a method of controlling an integrated braking device for a vehicle according to at least one embodiment of the present disclosure.

FIG. 5 is a flowchart of a method of controlling an integrated braking device for a vehicle according to at least one embodiment of the present disclosure.

The braking control unit 200 determines whether the vehicle is turned on (in Step S51). When the braking control unit 200 determines that the vehicle is not turned on, it remains in a standby state performing no subsequent process until the vehicle is turned on.

When the braking control unit 200 determines that the vehicle is turned on, it closes the first and second traction control valves 132, 133 (S52). By closing the first and second traction control valves 132, 133, the hydraulic path is separated between the master cylinder 120 and the braking system 100. Therefore, when the driver depresses the brake pedal 121, the pedal stroke does not directly cause the hydraulic pressure to be transmitted to the wheel brakes, but the driver depressing the brake pedal 121 is detected by the stroke sensor 123 which generates and transmits the detection signal to the braking control unit 200. The braking control unit 200 utilizes the received information as a basis for calculating the required braking force proportional to the pedal depression, and accordingly drives the first and second bi-directional pumps 141a, 141b, whereby supplying the braking force to the first to fourth wheel brakes w1, w2, w3, w4.

The braking control unit 200 constantly detects whether the driver depresses the brake pedal 121 while driving the vehicle (S53). When the braking control unit 200 detects the depression of the brake pedal 121 while the vehicle is running, it calculates a required braking force proportional to the pedal depression and supplies hydraulic pressure to the first to fourth wheel brakes (S54). Specifically, the braking control unit 200 drives the first and second bi-directional pumps 141a, 141b in the first direction and opens the first to fourth inlet valves 151, 152, 153, 154 to supply braking force to the first to fourth wheel brakes w1, w2, w3, w4. Driving of the first and second bi-directional pumps 141a, 141b may be controlled depending on the required braking force. After the required braking force is supplied, the first to fourth inlet valves 151, 152, 153, 154 are closed to maintain the same braking force.

The braking control unit 200 determines whether the driver's depression of brake pedal 121 has ended (S55). When the braking control unit 200 determines that the depression of the brake pedal 121 has not ended, it returns to Step S54. When the braking control unit 200 determines that the depression of the brake pedal 121 has ended, it performs control to drop the hydraulic pressure applied to the wheel brakes (S56). For dropping the hydraulic pressure applied to the wheel brakes, the same method may be used as those detailed in the description of FIGS. 3 and 4, which will not be repeated.

Since the braking control unit 200 needs to constantly perform such braking pressure increasing, maintenance or decreasing while driving the vehicle, it repeatedly performs an algorithm equivalent to the present method of controlling the vehicular integrated braking device unless the vehicle is turned off. Therefore, while the vehicle is not turned off, the braking control unit 200 returns to Step S53. When the braking control unit 200 determines that the vehicle is turned off, it ends this algorithm.

Figure 6:
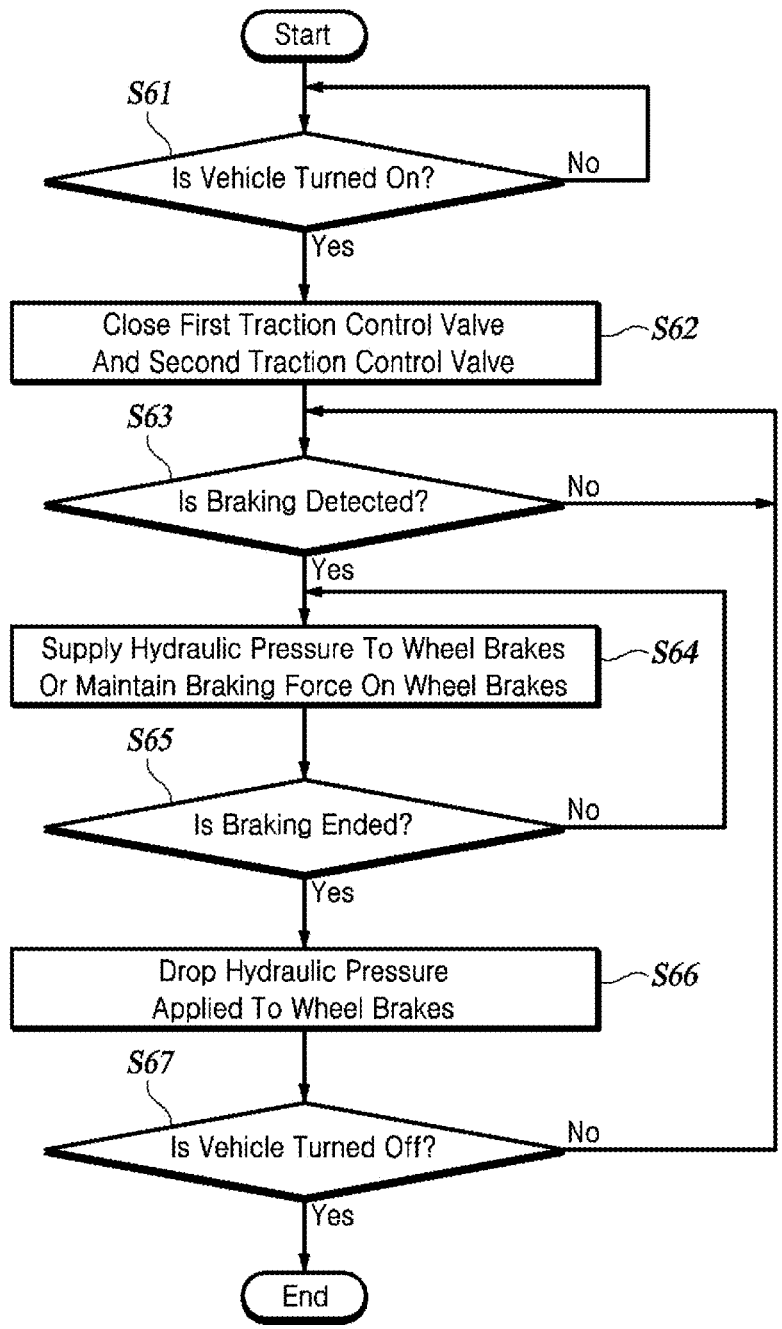
FIG. 6 is a flowchart of a method of controlling an integrated braking device for a vehicle according to another embodiment of the present disclosure.

FIG. 6 is a flowchart of a method of controlling an integrated braking device for a vehicle according to another embodiment of the present disclosure. Most of the flowchart process is the same as that shown in FIG. 5. While FIG. 5 is a flowchart when the driver directly engages in braking, FIG. 6 shows the vehicle controlling the braking situation during autonomous driving without driver intervention. A description of a portion of the process shown in FIG. 6 that overlaps with the process shown in FIG. 5 will be omitted. Only Steps S63 and S65 of the flowchart of FIG. 6 are different from the flowchart of FIG. 5.

The braking control unit 200 determines whether a braking situation is detected during autonomous driving of the vehicle without the driver's depressing of the brake pedal 121 (S63). In the vehicle, at least one of a camera sensor, a radar sensor, a lidar sensor, and an ultrasonic sensor is installed to detect a situation around the vehicle. With these sensors, the vehicle while running can detect the situation ahead and detect the vehicle's braking situation. Additionally, even when the braking control unit 200 does not detect the braking situation by using the front detection sensors, the braking control unit 200 can also detect when the brake pedal 121 is depressed due to the driver's intervention. When these braking situations occur, Step S64 is performed, which is equivalent to Step S54 in FIG. 5 for supplying hydraulic pressure to the wheel brakes or maintaining braking force on the wheel brakes.

After performing Step S64, the braking control unit 200 determines whether the braking situation has ended (S65). Whether the braking situation has ended is also determined by using sensors installed in the vehicle for detecting the surrounding environment. In this case, even when the driver has intervened in braking and then stopped depressing the brake pedal 121, if the braking control unit 200 determines that braking is still necessary, it does not determine that the braking situation has ended and returns to Step S64. When the braking control unit 200 determines that the braking situation has ended, it performs Step S66 which is equivalent to Step S56 in FIG. 5 for controlling to lower the hydraulic pressure applied to the wheel brakes.

Although the steps in FIGS. 5 and 6 are described to be sequentially performed, they merely instantiate the technical idea of some embodiments of the present disclosure. In other words, various modifications, additions, and substitutions are possible by changing the sequences described in the respective drawings or by performing two or more of the steps in parallel, and hence the step s in FIGS. 5 and 6 are not limited to the illustrated chronological sequences.

As described above, according to some embodiments of the present disclosure, a bi-directional pump is used to perform what the existing solenoid valve needed to do and replace the same to reduce the number of solenoid valves in the vehicular integrated braking device, thereby saving the manufacturing cost and reducing the volume and weight of the vehicular integrated braking device.

Additionally, when operating the bi-directional pump in the first direction, a braking force is supplied to the wheel brakes through the inlet valves, or a rapid pressure drop is induced to effect precisely controlled braking of the vehicle.

Further, when operating in the second direction, the bi-directional pump can cause hydraulic pressure oil to flow toward the oil chamber to fill it up and to quickly recover the hydraulic pressure oil to the reservoir, which allows decreasing the braking force supplied to the wheel brakes through the inlet valve, obviating the need for adding a separate valve.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An integrated braking device for a vehicle equipped with wheel brakes for braking the vehicle, the integrated braking device comprising:
   a reservoir;
   a master cylinder;
   bi-directional pumps each arranged to use hydraulic pressure oil supplied from the reservoir for generating hydraulic pressure in a first direction to apply a braking force to the wheel brakes or generating hydraulic pressure in a second direction opposing the first direction to control the hydraulic pressure oil from flowing to the reservoir;
   a motor arranged to drive the bi-directional pumps to control the hydraulic pressure oil flowing therethrough;
   inlet valves arranged to control the hydraulic pressure oil from flowing from the bi-directional pumps to the wheel brakes;
   traction control valves each disposed between the master cylinder and each of the bi-directional pumps to control a flow of the hydraulic pressure oil inside the master cylinder; and
   a braking control unit configured to perform the braking of the vehicle by transmitting a driving signal to solenoid valves included in the integrated braking device, the bi-directional pumps, and the motor and thereby control a flow of the hydraulic pressure oil,
   wherein the braking control unit is responsive to a turn-on of the vehicle, for closing the traction control valves to prevent the hydraulic pressure oil inside the master cylinder from flowing to the bi-directional pumps.

2. The integrated braking device of claim 1, further comprising:
   supply flow paths arranged to channel the hydraulic pressure oil from the reservoir to the bi-directional pumps; and
   oil chambers disposed on the supply flow paths respectively to improve a pressure increasing performance of the supply flow paths.

3. The integrated braking device of claim 1, wherein in the first direction, the hydraulic pressure oil flows from the bi-directional pumps through the inlet valves to the wheel brakes, and
   wherein in the second direction, the hydraulic pressure oil flows from the bi-directional pumps to the reservoir.

4. The integrated braking device of claim 3, wherein the braking control unit is configured to be responsive to when a driver of the vehicle depresses a brake pedal or when the braking control unit determines that braking of the vehicle is required, for driving the bi-directional pumps in the first direction and opening the inlet valves to supply the braking force corresponding to a depression of the brake pedal by the driver to the wheel brakes.

5. The integrated braking device of claim 3, wherein the braking control unit is configured to be responsive to when a driver of the vehicle has finished depressing a brake pedal or when the braking control unit determines that braking of the vehicle is not required, for driving the bi-directional pumps in the second direction and opening the inlet valves to reduce the braking force supplied to the wheel brakes.

6. The integrated braking device of claim 1, wherein the braking control unit is responsive to a need for maintaining an amount of the braking force supplied to the wheel brakes, for closing the inlet valves.

7. The integrated braking device of claim 1, further comprising:
- a return valve disposed in a return flow path between at least one of the traction control valves and the reservoir for the reservoir to recover the hydraulic pressure oil flowing through the at least one of the traction control valves.

8. The integrated braking device of claim 7, wherein the braking control unit is configured to be responsive to when a driver of the vehicle has finished depressing a brake pedal or when the braking control unit determines that braking of the vehicle is not required, for opening the inlet valves, the traction control valves, and the return valve for the reservoir to recover the hydraulic pressure oil.

9. A method of controlling an integrated braking device for a vehicle equipped with wheel brakes for braking the vehicle and including bi-directional pumps capable of discharging hydraulic pressure oil bidirectionally, the method comprising:

determining whether the vehicle has been started;
closing traction control valves each disposed between a master cylinder and each of the bi-directional pumps upon determining that the vehicle has been started;
determining whether the vehicle needs to be braked due to a depression of a brake pedal by a driver of the vehicle or a detection of braking while the vehicle is running;
upon determining that the vehicle needs to be braked, driving the bi-directional pumps in a first direction to supply a braking force to the wheel brakes; and
upon determining that the vehicle needs to be braked no longer, reducing the braking force supplied to the wheel brakes by driving the bi-directional pumps in a second direction.

10. The method of claim 9, wherein in the first direction, the hydraulic pressure oil flows from the bi-directional pumps to the wheel brakes, and
wherein in the second direction, the hydraulic pressure oil flows from the bi-directional pumps to a reservoir.

11. The method of claim 9, further comprising:
upon determining that the braking force supplied to the wheel brakes needs to be maintained, closing inlet valves that are disposed in flow paths between the wheel brakes and the bi-directional pumps.

12. The method of claim 9, wherein the reducing of the braking force supplied to the wheel brakes further comprises:
opening the traction control valves, and opening a return valve arranged to control the hydraulic pressure oil from flowing from the traction control valves to a reservoir.

* * * * *